(12) United States Patent
Ueki et al.

(10) Patent No.: US 7,866,630 B2
(45) Date of Patent: Jan. 11, 2011

(54) WINDING MECHANISM WITH TENSION CONTROL FUNCTION AND TRAWLING APPARATUS

(75) Inventors: Shuji Ueki, Chuo-ku (JP); Hirohumi Doi, Tamano (JP); Shogo Miyajima, Akishima (JP); Kenzo Hasegawa, Yokohama (JP); Hiroshi Satoh, Fujisawa (JP)

(73) Assignees: Mitsui Engineering & Shipbuilding Co., Ltd., Tokyo (JP); Tsurumi Seiki Co., Ltd., Kanagawa (JP); Dai-Ichi Electric Co., Ltd., Kanagawa (JP)

( * ) Notice: Subject to any disclaimer, the term of this patent is extended or adjusted under 35 U.S.C. 154(b) by 539 days.

(21) Appl. No.: 11/794,127

(22) PCT Filed: Jan. 17, 2006

(86) PCT No.: PCT/JP2006/300491

§ 371 (c)(1),
(2), (4) Date: Aug. 28, 2007

(87) PCT Pub. No.: WO2006/077811

PCT Pub. Date: Jul. 27, 2006

(65) Prior Publication Data

US 2008/0164365 A1 Jul. 10, 2008

(30) Foreign Application Priority Data

Jan. 18, 2005 (JP) .............................. 2005-010632

(51) Int. Cl.
*B66D 1/50* (2006.01)
*B65H 23/18* (2006.01)

(52) U.S. Cl. ...................... 254/274; 254/361; 254/266; 254/278; 242/413.5

(58) Field of Classification Search ................ 254/361, 254/362, 266, 274, 275, 278, 279
See application file for complete search history.

(56) References Cited

U.S. PATENT DOCUMENTS

| | | | | | |
|---|---|---|---|---|---|
| 3,774,883 | A | * | 11/1973 | Ostrom | 254/275 |
| 3,838,846 | A | * | 10/1974 | Ostrom | 254/275 |
| 4,132,387 | A | * | 1/1979 | Somerville et al. | 254/340 |
| 4,556,199 | A | * | 12/1985 | Dansie et al. | 254/348 |

(Continued)

FOREIGN PATENT DOCUMENTS

JP B 40-16617 7/1965

(Continued)

*Primary Examiner*—Evan H Langdon
(74) *Attorney, Agent, or Firm*—Oliff & Berridge, PLC

(57) ABSTRACT

To provide a winding mechanism and a trawling apparatus capable of eliminating an excessive tension or slack generated in a wire wound around a drum and keeping the tension or wire length of the wire constant.

A winding mechanism with tension control function includes a reversibly rotatable liquid-pressure motor rotating a drum having a wire wound therearound, a liquid-pressure pump coupled directly with the liquid-pressure motor and supplying hydraulic oil, and an electric motor rotating to drive the liquid-pressure pump. The winding mechanism further includes a control unit controlling a torque of the electric motor based on a variation in load current of the electric motor and winding off or winding up the wire to keep the tension of the wire at a set value.

1 Claim, 4 Drawing Sheets

U.S. PATENT DOCUMENTS 5,456,098 A * 10/1995 Hartwig et al. ................ 72/129
5,579,710 A * 12/1996 Piesinger ............... 114/230.22

FOREIGN PATENT DOCUMENTS

| | | |
|---|---|---|
| JP | B 41-9217 | 5/1966 |
| JP | A 52-86653 | 7/1977 |
| JP | A 54-140345 | 10/1979 |
| JP | A 55-61598 | 5/1980 |
| JP | A 56-144028 | 11/1981 |
| JP | A 59-26896 | 2/1984 |
| JP | A 2-215674 | 8/1990 |
| JP | A 2000-201572 | 7/2000 |
| JP | A 2004-192594 | 7/2004 |
| JP | A 2004-332890 | 11/2004 |

* cited by examiner

WINDING MECHANISM WITH TENSION CONTROL FUNCTION AND TRAWLING APPARATUS

BACKGROUND OF THE INVENTION

1. Field of the Invention

The present invention relates to a winding mechanism with tension control function and a trawling apparatus, and specifically relates, to a winding mechanism with tension control function and a trawling apparatus that control a wire to have a constant tension.

2. Description of the Related Art

There is a trawl fishing method in which an operation is performed by towing a trawl net from place to place by a fishing vessel. In the trawl fishing method, a fishing net is connected to wires of winding mechanisms set at both end portions of the rearward of a vessel's stem via otter boards and towed by the vessel. The fishing net can increase captured amounts of fishes and the like by increasing its open area. Accordingly, it is necessary that the tensions of the wires wound off from right and left winches be adjusted.

FIG. 4 shows a schematic structure of a conventional winding mechanism. As shown in the drawing, a fishing net (not shown) is attached to a tip of a wire wound off from a drum 2 of a winding mechanism 1. The winding mechanism 1 includes an oil-pressure motor 3 driving the drum 2 and an oil-pressure pump 4 supplying hydraulic oil to the oil-pressure motor 3, in which a relief valve 5 and a control valve 6 are set in an oil-pressure passage of the oil-pressure motor 3 and the oil-pressure pump 4. In addition, a wire-length sensor 7 and a tension sensor 8 are set in the middle course of the wire being, wound off.

In the winding mechanism 1 structured as above, based on detected signals of the wire-length sensor 7 and the tension sensor 8 of the wire, a control signal controlling the wire to have an appropriate length and tension is sent to the control valve 6 by a control unit (not shown). The oil-pressure pump 4 supplying the hydraulic oil to the oil-pressure motor 3 discharges the hydraulic oil in a manner that the hydraulic oil bypasses at the relief valve 5, so that the hydraulic pressure is adjusted and thereby the tension and the wire length are controlled.

Further, in the trawl fishing method shown in Japanese Patent Application Laid-Open No. 2000-201572, in order to keep the tensions affecting right and left wires substantially equal, current statuses of the tensions affecting the right and left wires are detected based on information detected by various sensors set at the wires. The operating statuses of the winches are then adjusted to thereby keep the tensions affecting right and left winches substantially equal. The adjustment of the operating status of the winch is specifically conducted by keeping the pressure of the oil supplied to the winch substantially constant. In other words, a reference oil pressure is kept by adjusting the pressure of an electromagnetic relief valve to increase or decrease.

[Patent document 1] Japanese Patent Application Laid-Open No. 2000-201572.

SUMMARY OF THE INVENTION

However, when the electromagnetic relief valve is used to adjust the tension of the wire, it is inevitably affected by the reference pressure. For instance, when a sudden large load such as an up and down movement (heaving) of the vessel affects the wire when winding up the wire, the pressure over the reference pressure is applied and the hydraulic oil is caused to bypass by passing through the relief valve to a tank to thereby rotate backward the drum of the winch. And when the load goes back to what it was before, the drum starts a normal winding up. Then, a slack is generated in the wire due to the up and down movement and the like of the vessel, and when a force such as of the up and down movement of the vessel and the like or of the weight of the fishing net and so forth is applied also when the wire is extended, an excessive tension acts and therefore the wire is sometimes cut.

Further, in the trawl fishing, in the case where a winch drum is locked, when a fishing vessel finds a school of fish and tries to change its direction, the tension of the wire in the turning direction is caused to lower than that of the other wire. The tensions affecting the trawl net become unbalanced, forcing the vessel only to go straight ahead.

Furthermore, when the fishing vessel tows the fishing net, in the case where the fishing net hooks mass of rock on the sea floor and causes an excessive tension to the wire, a normal winch locks by a break so that the winding drum does not rotate. Therefore, an accident, for example, the wire is cut, the vessel is capsized, or so forth, is caused, carrying a risk. In addition, it cannot cope with multiple changes in towing conditions such as a tidal current change, a speed change of the vessel, and so on.

The wire wound off from the winch is bundled and twisted thin wires with winding tendency, triggering a kink phenomenon in a moment when the tension lowers, so that the wire is caused to be cut. Therefore, it is also needed to keep a certain tension or more so as not to cause the kink phenomenon.

Therefore, in order to bring a solution to the above-described problems, an object of the present invention is to control a wire to have a constant tension. Further, another object of the present invention is to keep the wire length constant.

A winding mechanism with tension control function according to the present invention includes: a reversibly rotatable liquid-pressure motor rotating a drum having a wire wound therearound; a liquid-pressure pump coupled directly with the liquid-pressure motor and supplying hydraulic oil; an electric motor rotating to drive the liquid-pressure pump; and a control unit controlling a torque of the electric motor based on a variation in load current of the electric motor and winding off or winding up the wire to keep a tension of the wire at a set value.

In this case, the liquid-pressure pump is of a two-way discharge fixed volume type and the electric motor is a reversibly rotatable servo motor, in which the control unit controls a discharge volume, a discharge direction and a discharge pressure of the hydraulic oil of the liquid-pressure pump via the servo motor.

A winding mechanism with tension control function according to the present invention includes: a reversibly rotatable liquid-pressure motor rotating a drum having a wire wound therearound; a liquid-pressure pump coupled directly with the liquid-pressure motor and supplying hydraulic oil; an electric motor rotating to drive the liquid-pressure pump; and a control unit controlling a torque of the electric motor based on a variation in load current of the electric motor, winding off or winding up the wire to keep a tension of the wire at a set value, and winding off or winding up the wire based on a variation in a detected value of a wire-length sensor to keep a length of the wire at a set value.

In this case, the liquid-pressure pump is of a two-way discharge fixed volume type and the electric motor is a reversibly rotatable servo motor, in which the control unit controls a discharge volume, a discharge direction and a discharge pressure of the hydraulic oil of the liquid-pressure pump via the servo motor.

A winding mechanism with tension control function according to the present invention includes: a reversibly rotatable liquid-pressure motor rotating a drum having a wire wound therearound; a liquid-pressure pump coupled directly with the liquid-pressure motor and supplying hydraulic oil; an electric motor rotating to drive the hydraulic pump; and a control unit controlling a discharge volume of the liquid-pressure pump based on a variation in load pressure of the liquid-pressure pump and winding off or winding up the wire to keep a tension of the wire at a set value.

In this case, the liquid-pressure pump is of a two-way discharge variable volume type, and the control unit controls the liquid-pressure pump to control a discharge volume, a discharge direction and a discharge pressure of the hydraulic oil.

A winding mechanism with tension control function according to the present invention includes: a reversibly rotatable liquid-pressure motor rotating a drum having a wire wound therearound; a liquid-pressure pump coupled directly with the liquid-pressure motor and supplying hydraulic oil; a discharge volume controller controlling a discharge of the liquid-pressure pump; and a control unit controlling a discharge volume of the liquid-pressure pump based on a variation in load pressure of the liquid-pressure pump, winding off or winding up the wire to keep a tension of the wire at a set value, and winding off or winding up the wire based on a variation in a detected value of a wire-length sensor to keep the wire length at a set value.

In this case, the liquid-pressure pump is of a two-way discharge variable volume type, and the control unit controls the liquid-pressure pump to control a discharge volume, a discharge direction and a discharge pressure of the hydraulic oil.

A trawling apparatus according to the present invention includes: a reversibly rotatable liquid-pressure motor rotating a drum having a right or left wire of a trawl net wound therearound; a liquid-pressure pump supplying hydraulic oil to the liquid-pressure motor; and an electric motor rotating to drive the liquid-pressure pump, in which the trawling apparatus further includes a control unit controlling a torque of the electric motor based on a variation in load current of the electric motor and winding off or winding up the right or left wire to keep a right or left tension of the trawl net at a set value.

The winding mechanism with tension control function and the trawling apparatus having the above-described structure controls the discharge volume of the pump being in proportional relation to the torque based on the variation in the load current of the electric motor to wind up or wind off the wire, so that the tension of the wire can be kept constant. Therefore, the need of a control valve conventionally used to control the oil-pressure pump is eliminated, allowing the consumption energy to be saved.

Further, according to the present invention, the oil-pressure pump and the oil-pressure motor are directly coupled, exhibiting a favorable responsiveness, in which the excessive tension or slack is not generated in the wire. Accordingly, when towing the trawl net, the wire is prevented from being cut due to the kink phenomenon. Moreover, even when a trawling vessel turns, the excessive tension is not generated in the wire at the turning side, allowing the vessel to turn at a constant tension.

Furthermore, when the excessive tension is applied to the wire, by automatically winding off the wire to reduce the excessive tension, power can be generate backed by a reverse rotation of the electric motor, in which by consuming the power by resistance, a break performance can be effected.

DESCRIPTION OF NUMERALS

1 . . . winding mechanism; 2 . . . drum; 3 . . . oil-pressure motor; 4 . . . oil-pressure pump; 5 . . . relief valve; 6 . . . control valve; 7 . . . wire length sensor; 8 . . . tension sensor; 10 . . . winding mechanism with tension control function; 12 . . . drum; 14 . . . wire; 16 . . . trawl net; 18 . . . otter board; 20 . . . pulley; 22 . . . wire length measure; 30 . . . winding apparatus, 32 . . . control unit; 34 . . . comparator; 38 . . . current detector; 40 . . . servo amplifier; 42 . . . oil-pressure motor (liquid-pressure motor); 44 . . . oil-pressure pump; 46 . . . servo motor; 50 . . . trawling apparatus; 60 . . . oil tank; 71 . . . discharge volume control unit; 74 . . . two-way discharge variable volume type oil-pressure pump; 76 . . . induction motor; 77 . . . fixed volume pump; 78 . . . double rod type liquid pressure cylinder; and 80 . . . pressure detector.

DETAILED DESCRIPTION

Figure 1:
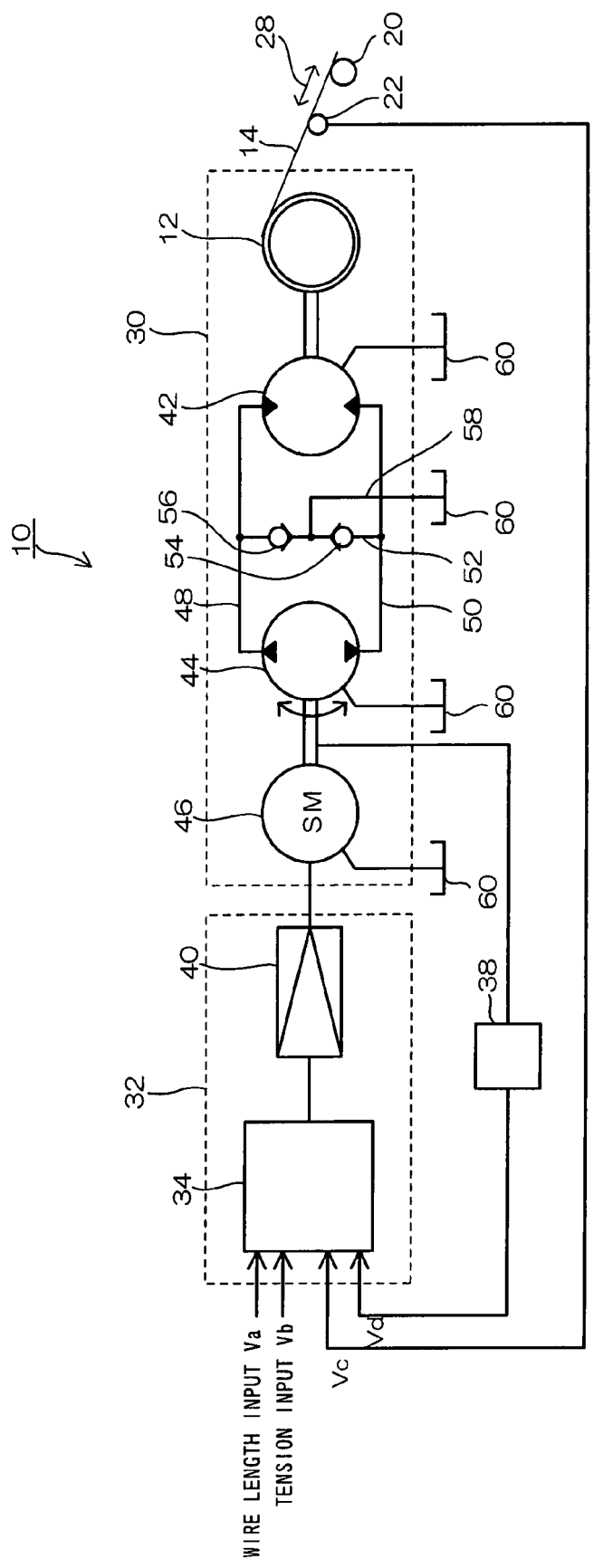
FIG. 1 is a view showing a schematic structure of a winding mechanism with tension control function according to a first embodiment of the present invention.

Embodiments of a winding mechanism with tension control function and a trawling apparatus according to the present invention will be described in detail along with the attached drawings. FIG. 1 is a view showing a schematic structure of a winding mechanism with tension control function according to a first embodiment of the present invention.

A winding mechanism with tension control function 10 (hereinafter called the "winding mechanism") includes, as shown in FIG. 1, a winding apparatus 30 winding off and winding up a wire 14 and a control unit 32 controlling the winding apparatus 30. The control unit 32 includes a comparator 34 and a servo amplifier 40.

Figure 4:
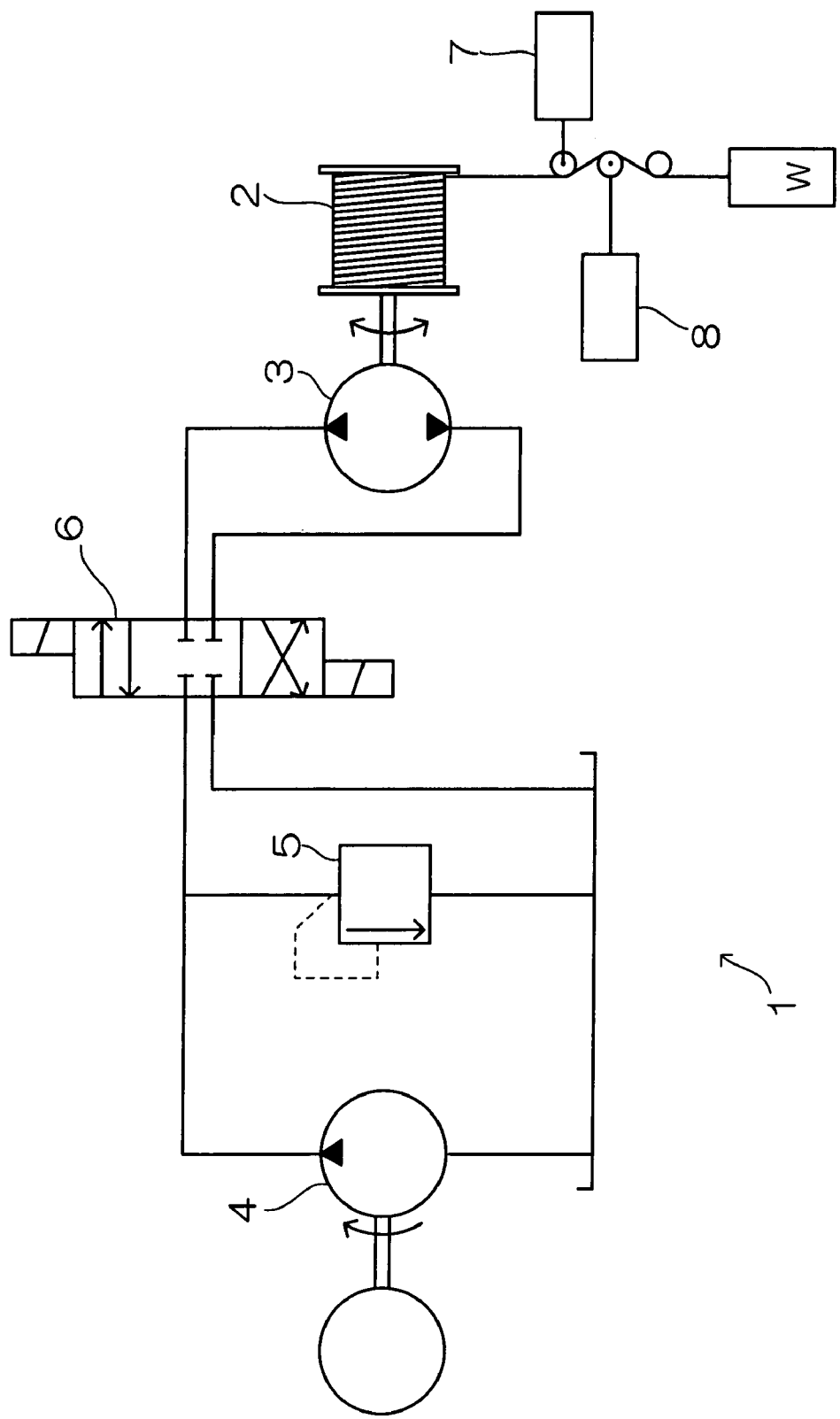
FIG. 4 is a view showing a schematic structure of a conventional winding mechanism.

A set wire length Va and a set tension Vb of the wire 14 are inputted into the comparator 34. Further, a detected signal Vc of a later-described wire length measure 22 and a detected signal Vd of a later-described current detector 38 are inputted into the comparator 34 as feedback signals. In the comparator 34, a difference between the set wire length Va and the detected signal Vc of the wire length measure 22 is obtained to be outputted to the servo amplifier 40. Further, the detected signal Vd of the current detector 38 is converted into such a torque of a servo motor 46 that the tension comes to the set tension Vb, and outputted to the servo amplifier 40. The servo amplifier 40 outputs such a drive control signal of the winding apparatus 30 that can obtain the set wire length Va and the set tension Vb. Needless to say, it is also acceptable that the tension of the wire is measured directly to be used as a feedback signal Vd as in a tension sensor 8 in FIG. 4.

Meanwhile, the winding apparatus 30 includes: a drum 12 having the wire 14 wound therearound; an oil-pressure motor (liquid-pressure motor) 42 coupled directly with the drum 12 to reversibly rotate the drum 12; an oil-pressure pump 44 of two-way discharge fixed volume type being a liquid-pressure pump supplying hydraulic oil to the oil-pressure motor 42; and the servo motor 46 rotating the oil-pressure pump 44, as main components.

The servo motor 46 is reversibly rotatable, and the discharge direction and discharge volume of the hydraulic oil of the oil-pressure pump 44 changes with the change in the rotation direction and rotation speed of the servo motor 46. Further, the oil-pressure pump 44 is coupled directly with one inflow port of the oil-pressure motor 42 with its one discharge port via a pipe line 48, and with the other inflow port of the oil-pressure motor 42 with its the other discharge port via a pipeline 50. The oil-pressure pump 44, the oil-pressure motor 42 and the pipelines 48, 50 form a closed circuit. Further, the servo motor 46 is connected to a motor drive circuit (not shown) that controls the rotation direction and rotation speed of the servo motor 46 based on the output signal of the servo amplifier 40.

Note that a pipeline 52 is provided between the pipeline 48 and the pipeline 50. In the pipeline 52, a pair of check valves 54, 56 is disposed in a mutually confronting manner. These check valves 54, 56 are to compensate for those flowed out into a drain due to an internal leakage in the oil-pressure pump 44 and the oil-pressure motor 42, and are connected to an oil tank 60 via a pipeline 58 provided therebetween. Further, the oil-pressure pump 44 and the oil-pressure motor 42 compose a speed reducer with a fixed speed reduction ratio.

The wire length measure 22 is provided between the drum 12 and a pulley 20 supporting the wire 14 wound off. When the drum 12 rotates in the forward or backward direction as shown by an arrow 28 to wind off or wind up the wire 14, the wire length measure 22 detects the wound-off length of the wire 14 to thereby input it into the control unit 32.

The current detector 38 is connected between the servo motor 46 and the oil-pressure pump 44 to detect output current of the servo motor 46. In the servo motor 46, the load current varies depending on the tension of the wire 14. Accordingly, the load current of the servo motor 46 is detected and the detected signal Vd is fed back to the comparator 34.

Hereinafter, the description will be given of effects of the winding mechanism 10 of the first embodiment having the above-described structure. The wire 14 is sometimes applied an excessive tension or generates a slack due to various reasons, for example, when the vessel's body is moved in the up and down direction (heaving), when the trawl net provided at the tip of the wire 14 hooks mass of rock, or so on. Then, the control to keep the tension and wire length of the wire 14 constant is performed as will be described below.

First, the case in which the excessive tension is applied to the wire 14 will be described. In the comparator 34 of the control unit 32, the set tension Vb is inputted to keep the tension of the wire 14 constant. When the wire 14 is applied the excessive tension, the load current of the servo motor 46 shows an increase. Based on the detected signal Vd of the current detector 38, the comparator 34 obtains by conversion the torque of the servo motor 46 making the tension be the set tension Vb, and send it to the servo amplifier 40. The servo amplifier 40 outputs a control signal capable of reducing the excessive tension applied to the wire and corresponding to the wound-off of the wire 14 to the not-shown motor drive circuit.

The motor drive circuit rotates, for example, forward in accordance with the output signal of the servo amplifier 40 to thereby control the discharge direction and discharge volume of the hydraulic oil of the oil-pressure pump 44. Based on this, the hydraulic oil is supplied to the oil-pressure motor 42, and the oil-pressure motor 42 rotates forward to rotate the drum 12. The wire 14 is wound off substantially in parallel with the rotation of the drum 12.

The servo amplifier 40 outputs such a drive control signal of the servo motor 46 that matches the detected signal Vd of the current detector 38 with the set tension. With the wire 14 having the tension applied, the wire 14 is wound off from the drum 12 to rotate the drum 12. The oil pressure in the rotating direction increases to rotate backward the oil-pressure motor 42 directly coupled with the drum 12, so that the oil-pressure pump 44 directly coupled with the oil-pressure motor 42 rotates backward as well. Then, the servo motor 46 of the oil-pressure pump 44 rotates backward as well to act as an electric generator, and the generated electric energy is caused to flow back into the motor drive circuit. By consuming the electric energy with resistance, a break performance can be effected. Further, even when the electric energy is made to flow back into the break drive circuit, the break performance can be effected as well. With this, the excessive tension affecting to the wire 14 is removed and the tension is kept at the set tension Vb.

After the tension is adjusted to a certain tension, the wire length measure 22 detects the wound-off length Vc of the wire 14 to input it into the comparator 34 of the control unit 32 as a feedback signal. The comparator 34, then, obtains the difference from the feedback signal based on the set wire length Va and the output signal Vc of the wire length measure 22 to output it to the servo amplifier 40. Then, the wire 14 is wound up to the set wire length to be kept at the set wire length Va while the tension stays constant.

Subsequently, the description will be given of the case where a slack is generated in the wire 14. When a slack is generated in the wire 14, the wire 14 is free from the tension. From a different perspective, the load of the servo motor 46 is reduced to reduce the load current. Then, in the comparator 34, based on the detected signal Vd, a conversion is made to obtain the torque of the servo motor, in which the tension becomes the set tension Vb, and the obtained torque is sent out to the servo amplifier 40. The servo amplifier 40 outputs such a control signal that can ensure the set tension Vb of the wire and corresponds to the wound up of the wire 14 to the motor drive circuit (not shown).

The motor drive circuit rotates in accordance with the output signal of the servo amplifier 40, for example, backward, to thereby control the discharge direction and discharge volume of the hydraulic oil of the oil-pressure pump 44. Based on this, the hydraulic oil is supplied to the oil-pressure motor 42, and the oil-pressure motor 42 rotates backward to rotate the drum 12. The wire 14 is wound up substantially in parallel with the rotation of the drum 12. The servo amplifier 40 outputs the drive control signal of the servo motor 46 until the detected signal Vd of the current detector 38 can obtain the set tension Vb.

Based on this, even when the slack is generated in the wire 14, the wire 14 is immediately wound up until the set tension Vb can be obtained to thereby be kept at a certain tension. After the wire is kept at a certain tension, the feedback signal based on the detected signal Vc by the wire length measure 22 is inputted into the comparator 34, and the difference from the set wire length Va is obtained to be outputted to the servo amplifier 40. Then, the wire 14 is wound off up to the set wire length Va to be kept at the set wire length Va while the tension stays constant.

Note that it is also acceptable that the discharge direction of the hydraulic oil of the oil-pressure pump is made to a single direction and the supply of the hydraulic oil to the oil-pressure motor 42 is switched by a tree-way-valve and the like to thereby rotate forward or backward the oil-pressure motor 42.

Figure 3:
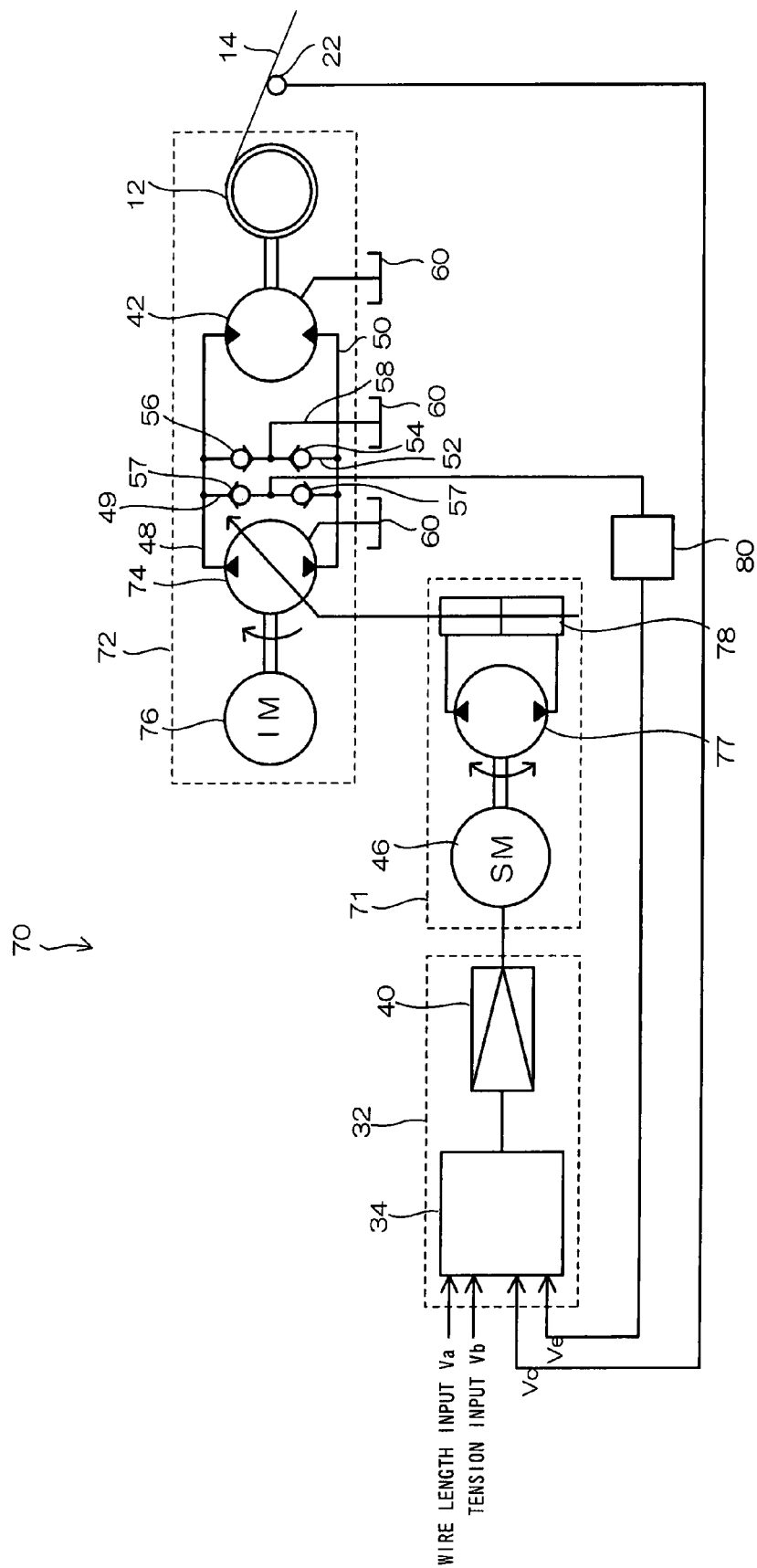
FIG. 3 is a detail explanation view of a winding mechanism with tension control function according to a second embodiment of the present invention.

FIG. 3 is an explanation view of a second embodiment. Note that the same structure as of the first embodiment performs the same effect and the description thereof will be omitted. In a winding mechanism 70 according to the second embodiment, differently from the structure of the winding apparatus 30 shown in FIG. 1, and a discharge volume control unit 71 is newly added. Specifically, in a winding apparatus 72 according to the second embodiment, the liquid-pressure pump is composed of an oil-pressure pump 74 of a two-way discharge variable volume type and the electric motor is composed of a general-purpose inductive motor 76 always rotating in a single direction at a certain rotation speed. The oil-pressure pump 74 of the two-way discharge variable volume type is, in the present embodiment, composed of a swash-plate pump and connected to the discharge volume control unit 71. The discharge volume control unit 71 is composed of: the servo motor 46; the fixed volume pump 77; and the double rod type liquid pressure cylinder 78, and the tilt direction and the tilt angle of the swash plate is controlled based on the output signal of the servo amplifier 40 of the control unit 32 to thereby control the discharged direction and discharge volume of the hydraulic oil of the oil-pressure pump 74 of the two-way discharge variable volume type. Further, the oil-pressure pump 74 of the two-way discharge variable volume type and the oil-pressure motor 42 are connected by the pipe lines 48, 50 to compose a speed reducer with a variable speed reduction ratio, namely a gearless transmission.

Between the pipe lines 48, 50 at the discharge side of the oil-pressure pump 74 of the two-way discharge variable volume type, a pipe line 49 is provided. The pipe line 49 is provided with a pressure detector 80 via a pair of check valves 57. The pair of check valves 57 is designed to allow a later-described pressure detector to detect pressure even when any of them has a pressure increase.

The pressure detector 80 detects the pressure of the oil-pressure pump 74 of the two-way discharge variable volume type. Depending on the tension of the wire 14, the pressure added to the oil-pressure pump 74 of the two-way discharge variable volume type varies. Accordingly, the pressure added to the oil-pressure pump 74 of the two-way discharge variable volume type is detected and a detected signal Ve thereof is fed back to the comparator 34.

In the thus-structured winding mechanism 70 according to the second embodiment, the inductive motor 76 always rotates in the single direction at the certain rotation speed to thereby rotate the swash-plate pump 74 in the single direction at the certain rotation speed. Then, based on the output signal of the comparator 34, the servo amplifier 40 composing the control unit 32 outputs such a signal that can obtain a required wind-off speed or wind-up speed of the wire 14 in accordance with the discharge direction and discharge volume of the hydraulic oil of the oil-pressure pump 74 of the two-way discharge variable volume type. The output signal of the servo amplifier 40 is given to the discharge volume control unit 71, and the discharge volume control unit 71 controls the tilt direction and the tilt angle of the swash plate of the oil-pressure pump 74 of the two-way discharge variable volume type. Based on this, the hydraulic oil is supplied from the oil-pressure pump 74 of the two-way discharge variable volume type to the oil-pressure motor 42, and the oil-pressure motor 42 rotates forward or backward to thereby wind off or wind up the wire 14 in a manner that the excessive tension and slack acting to the wire 14 are offset. Accordingly, even in the winding mechanism 70 according to the second embodiment, the same effect as of the previously-described embodiment can be obtained as well.

Figure 2:
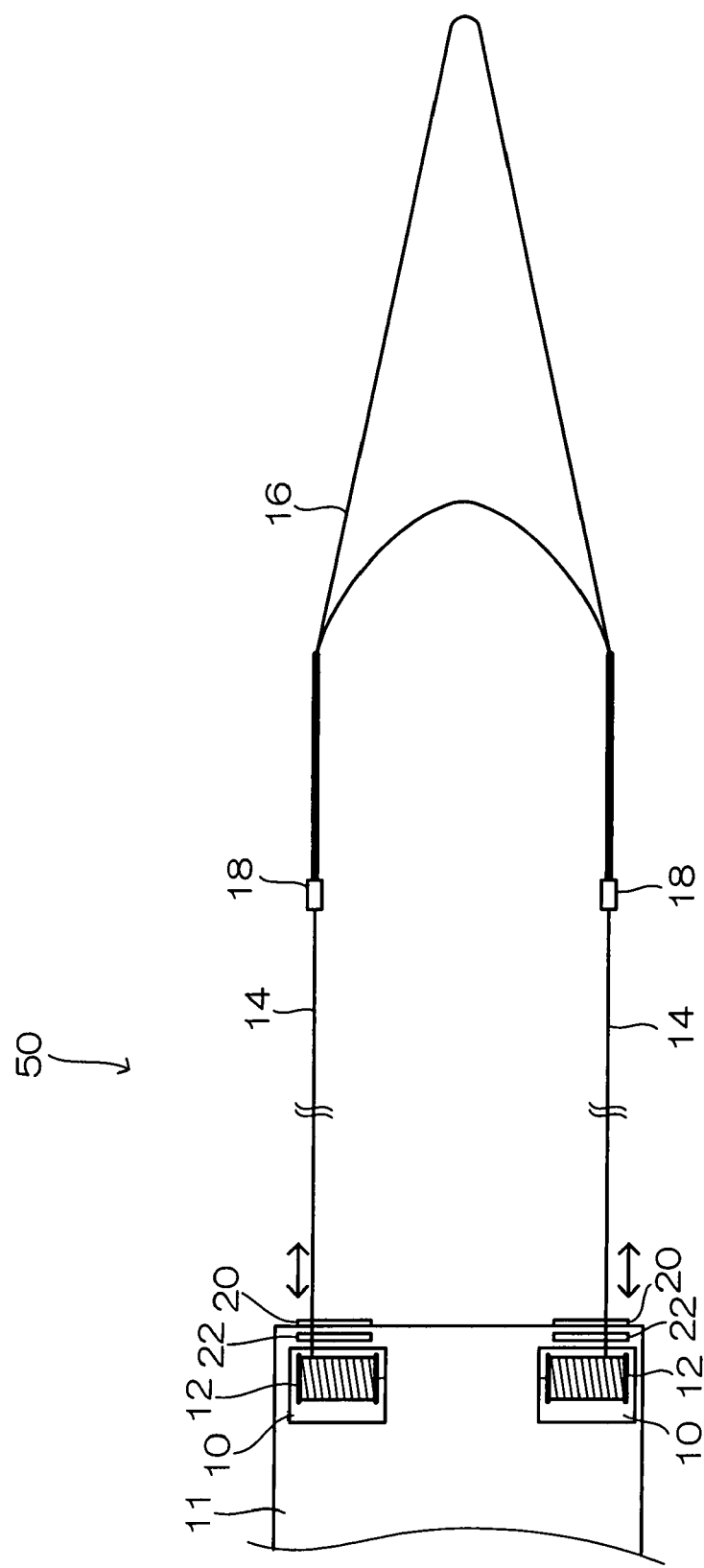
FIG. 2 is a view showing a schematic structure of a trawling apparatus according to the present invention.

FIG. 2 is a view showing a schematic structure of a trawling apparatus. A trawling apparatus 50 to be set at a fishing vessel and the like is provided with the two drums 12 each composing a part of the winding mechanism 10 with tension control function, the two drums 12 being provided in a freely rotatable manner at right and left decks 11, respectively, of the stern of the vessel. The wire 14 is wound around the each drum 12. The tip of the wire 14 is led to the pulley 20 mounted in a freely rotatable manner and extended into the sea rearward from the pulley 20. Further, the two tips of the wire 14 are connected to the end portions of the trawl net 16 via the right and left otter boards 18, respectively. Each of the two units of winding mechanism 10 with tension control function has the structure shown in FIG. 1, respectively. Specifically, it is structured to include: the reversibly rotatable liquid-pressure motor 42 rotating the right or left drum 12 having the wire 14 wound therearound; the liquid-pressure pump 44 supplying the hydraulic oil to the liquid-pressure motor 42; the electric motor driving the liquid-pressure pump 44; and the control unit 32 controlling the torque of the electric motor based on the variation in the load current of the electric motor to wind off or wind up the right or left wire 14 to thereby keep the right or left tensions of the trawl net 16 at a set value. The control units 32 of the winding mechanisms 10 with tension control function control the torques of the electric motors based on the variation in the load currents of the electric motors to control the tensions and the wire lengths of the right and left wires 14.

Backed by this, when the vessel towing the trawl net 16 makes a turn, even when the wire 14 at the turning side suffers an excessive tension, the winding mechanism 10 at the turning side keeps the tension of the wire 14 at the set tension, allowing maintaining the balance of the right and left tensions of the trawl net 16.

Note that the winding mechanism 10 with tension control function of the trawling apparatus 50 may alternatively be structured such that the liquid-pressure pump 44 is of a two-way discharge fixed volume type, the electric motor is the reversibly rotatable servo motor 46, and the control unit 32 controls the discharge volume and the discharge pressure of the hydraulic oil of the liquid-pressure pump 44 via the servo motor 46. Further, it is also acceptable that the control unit 32 winds off or winds up the wire 14 to keep the tension of the wire 14 at the set value and winds off or winds up the wire 14 based on the variation in the detected value of the wire length sensor to keep the wire length at the set value.

Furthermore, the oil-pressure pump 74 of the two-way discharge variable volume type of the second embodiment can be used as well.

The winding mechanism with tension control function and the trawling apparatus according to the present invention can keep the tension of the wire constant even when the excessive tension or slack is generated in the wire wound around the drum by winding up or winding off the wire, allowing themselves to be used for a towing work of the fishing net, or the trawl fishing.

What is claimed is:

1. A trawling method of towing a trawl net by winding off or winding up a right or left wire comprising:
   rotating a drum with a reversibly rotatable liquid-pressure motor, the drum having the right or left wire of the trawl net wound therearound;
   supplying hydraulic oil with a liquid pressure pump to the liquid-pressure motor;

driving the liquid-pressure pump with an electric motor; and controlling a torque of the electric motor based on a variation in tension of the wire and winding off or winding up the right or left wire to keep right or left tension of the trawl net at a set value, and then keeping a length of the wire at a set value while the right or left tension of the trawl net stays at the set value.

* * * * *